US007887413B2

(12) United States Patent
Freimuth et al.

(10) Patent No.: US 7,887,413 B2
(45) Date of Patent: Feb. 15, 2011

(54) AMUSEMENT GAME

(75) Inventors: Uwe Freimuth, Dallas, TX (US); Christopher John McGrath, Singapore (SG)

(73) Assignee: Matahari Studios Pty Ltd., Northbridge (AU)

( * ) Notice: Subject to any disclaimer, the term of this patent is extended or adjusted under 35 U.S.C. 154(b) by 1134 days.

(21) Appl. No.: 11/595,254

(22) Filed: Nov. 8, 2006

(65) Prior Publication Data

US 2008/0108427 A1 May 8, 2008

(51) Int. Cl.
*G06F 17/00* (2006.01)

(52) U.S. Cl. .......................................................... 463/25

(58) Field of Classification Search .............. 463/16–25
See application file for complete search history.

(56) References Cited

U.S. PATENT DOCUMENTS

| | | | | |
|---|---|---|---|---|
| 5,775,692 | A * | 7/1998 | Watts et al. | 273/143 R |
| 6,824,466 | B1 * | 11/2004 | Hirota | 463/20 |
| 6,860,811 | B1 | 3/2005 | Wilkins | |
| 6,971,543 | B2 * | 12/2005 | Halliburton et al. | 221/75 |
| 2002/0151353 | A1 | 10/2002 | Gauselmann | |
| 2006/0194630 | A1 * | 8/2006 | Pellegrini et al. | 463/25 |
| 2008/0167118 | A1 * | 7/2008 | Kroeckel et al. | 463/25 |
| 2009/0048010 | A1 * | 2/2009 | Kroeckel et al. | 463/13 |

* cited by examiner

*Primary Examiner*—Ronald Laneau
(74) *Attorney, Agent, or Firm*—Bachman & LaPointe, P.C.

(57) ABSTRACT

The present invention relates to a win method for use in an amusement game, and an amusement game that utilizes the win method. In each play or attempt of the game the player has the choice of trying for a major prize or vending a minor prize. If they opt for the minor prize, the minor prize is vended and the game ends. If they opt for the major prize, the game continues. If they win the major prize, a major prize is vended and the game ends. If they do not win the major prize and it is not the last attempt, the game continues. They have the option of trying for the major prize again or opting for the minor prize. On the last attempt, if the player opts for a major prize and loses, they do not win any prize and the game ends.

15 Claims, 4 Drawing Sheets

AMUSEMENT GAME

FIELD OF INVENTION

The present invention relates to amusement games that dispense prizes. Such amusement games enable users to participate in game play implemented by the amusement game and win prizes in response to the game play outcome.

BACKGROUND TO THE INVENTION

Amusement games that vend or dispense prizes come in many forms and are well known. Amusement games are provided in amusement arcades, fair grounds and many other locations. They come in the form of machines or apparatus that implement game play on the basis of user input and machine programming or configuration. They allow people to participate in the game play offered, and the game machines provide or dispense prizes in response to the outcome of the game play. Amusement games come in myriad forms. For example, computer or video type games that include the ability to dispense prizes, coin operated games, and vending machines that implement games could all be considered amusement games. There are many others also. Such games can be mechanical and/or electronic in their structure.

Amusement games include a criteria by which they determine how and when to dispense prizes and what prizes to dispense. Generally prizes are dispensed based on the outcome of the game play after the participant has played one or more "rounds" of the game. The output of the game play may be based on luck, skill or a combination of both. When certain game play outcomes are achieved, a particular prize or prizes will be dispensed to the player, and when other outcomes are achieved no prizes may be dispensed. Games might have a hierarchy of prizes that are dispensed; some prizes being more desirable than others, those being more desirable being harder to win. The amusement game is configured with criteria to determine which game play outcome(s) result in which prizes (if any) being dispensed.

For example, in many amusement games a major and minor prize system is implemented with specific criteria required for winning a prize. In this system, players need to reach a certain level within the game to be able to win a minor prize. When the user plays the game and they reach that level, they are offered a choice of winning the minor prize attached to that level or continuing to try to win a major prize. If they choose to win the minor prize, the machine dispenses the prize and the game ends. If the player continues to play for the major prize and wins, then they receive the major prize from the machine. However, if they continue to try for the major prize and fail then the game ends and they do not win any prizes at all.

SUMMARY OF THE INVENTION

It is an object of the invention to provide an amusement game that allows the user a choice of winning a minor prize or playing for a major prize.

In one aspect the present invention may be said to consist in an amusement game adapted to dispense prizes comprising: a processor for generating game play, an display adapted to communicate game play outcomes generated by the processor to a user, an input adapted to enable a user to influence the processor's generation of game play outcomes, a dispenser adapted to store prizes and dispense prizes via an outlet, wherein the processor executes a program and is adapted to operate the dispenser to dispense prizes to a user in accordance with the program, the program adapted to: i) receive input indicating whether the user wants to win a major prize or minor prize, ii) if the received input indicates the user wants to win a minor prize, control a dispenser of the amusement game to dispense a minor prize, iii) if the received input indicates the user wants to win a major prize, a) generate game play, b) if the game play outcome corresponds to a user winning a major prize, operate the dispenser to dispense a major prize, c) if the game play outcome does not correspond to a user winning a major prize, determining whether the user is allowed a further attempt to win a prize, d) if the user is allowed a further attempt to win a prize, reiterate steps i)-iii), e) if the user is not allowed a further attempt to win a prize, terminate game play.

Preferably, the program determines the user is allowed a further attempt to win a prize if the number of times the user has attempted to win a prize is below a threshold number.

Preferably, the program determines the user is allowed a further attempt to win a prize if a predetermined period of time has not elapsed.

Preferably, a major prize is more desirable than a minor prize.

Preferably, the display is a physical back-lit game board, mechanical display or alternatively a video screen.

Preferably, the input comprises one or more control devices to enable a user to control game play.

Preferably, each control device is one or more of a: joystick, button, dial lever, knob.

Alternatively, the input is a touch screen and the control devices are indicia displayed on the touch screen.

In one embodiment, the game play imitates a board game and game play outcome corresponds to positions reached on the board game.

Preferably, a major prize is more desirable than a minor prize. Preferably, in step d) above, for at least one reiteration the program is adapted to reiterate step iii) only.

In another aspect the present invention may be said to consist in a program for implementation in an amusement game played by a user for determining when to dispense a prize to the user, the program adapted to: i) receive input indicating whether the user wants to win a major prize or minor prize, ii) if the received input indicates the user wants to win a minor prize, operate a dispenser of the amusement game to dispense a minor prize, iii) if the received input indicates the user wants to win a major prize, a) generate game play, b) if the game play outcome corresponds to a user winning a major prize, operate a dispenser of the amusement game to dispense a major prize, c) if the game play outcome does not correspond to a user winning a major prize, determining whether the user is allowed a further attempt to win a prize, d) if the user is allowed a further attempt to win a prize, reiterate steps i)-iii), e) if the user is not allowed a further attempt to win a prize, terminate game play.

Preferably, the program determines that the user is allowed a further attempt to win a prize if the number of times the user has attempted to win a prize is below a threshold number.

Preferably, the program determines the user is allowed a further attempt to win a prize if a predetermined period of time has not elapsed.

Preferably, a major prize is more desirable than a minor prize.

Preferably, in step d) above, for at least one reiteration the program is adapted to reiterate step iii) only.

In another aspect the present invention may be said to consist in a method for determining when to dispense a prize to a user of an amusement game, the method comprising the steps of: i) receiving input indicating whether the user wants to win a major prize or minor prize, ii) if the received input indicates the user wants to win a minor prize, operating a dispenser of the amusement game to dispense a minor prize, iii) if the received input indicates the user wants to win a major prize, a) generating game play, b) if the game play outcome corresponds to a user winning a major prize, operating a dispenser of the amusement game to dispense a major prize, c) if the game play outcome does not correspond to a user winning a major prize, determining whether the user is allowed a further attempt to win a prize, d) if the user is allowed a further attempt to win a prize, reiterating steps i)-iii), e) if the user is not allowed a further attempt to win a prize, terminating game play.

Preferably, the method determines that the user is allowed a further attempt to win a prize if the number of times the user has attempted to win a prize is below a threshold number.

Preferably, the method determines the user is allowed a further attempt to win a prize if a predetermined period of time has not elapsed.

Preferably, a major prize is more desirable than a minor prize.

Preferably, in step d) above, for at least one reiteration the program is adapted to reiterate step iii) only.

The term "comprising" as used in the claims means "consisting at least in part of". When interpreting statements in the claims which include that term, the features, prefaced by that term in each statement, all need to be present but other features can also be present. Related terms such as "comprise" and "comprised" are to be interpreted in the same manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the invention will be described with a reference to the following figures, of which.

DETAILED DESCRIPTION OF PREFERRED EMBODIMENTS

In the present specification, the term "amusement game" corresponds to any machine, apparatus, game or the like that offers game play whereby a user can at least partially influence the outcome of game play implemented on the amusement game. The term "game play" refers to the playing of a particular game, or at least a portion of such a game. The term "game play outcome" relates to any outcomes, events or the like that result from playing the particular game or a portion of it. The game itself could be one of myriad game types, such as games of chance, board games, card games, games of skill or the like. The types of games that could be implemented will be known to those skilled in the art.

Figure 1:
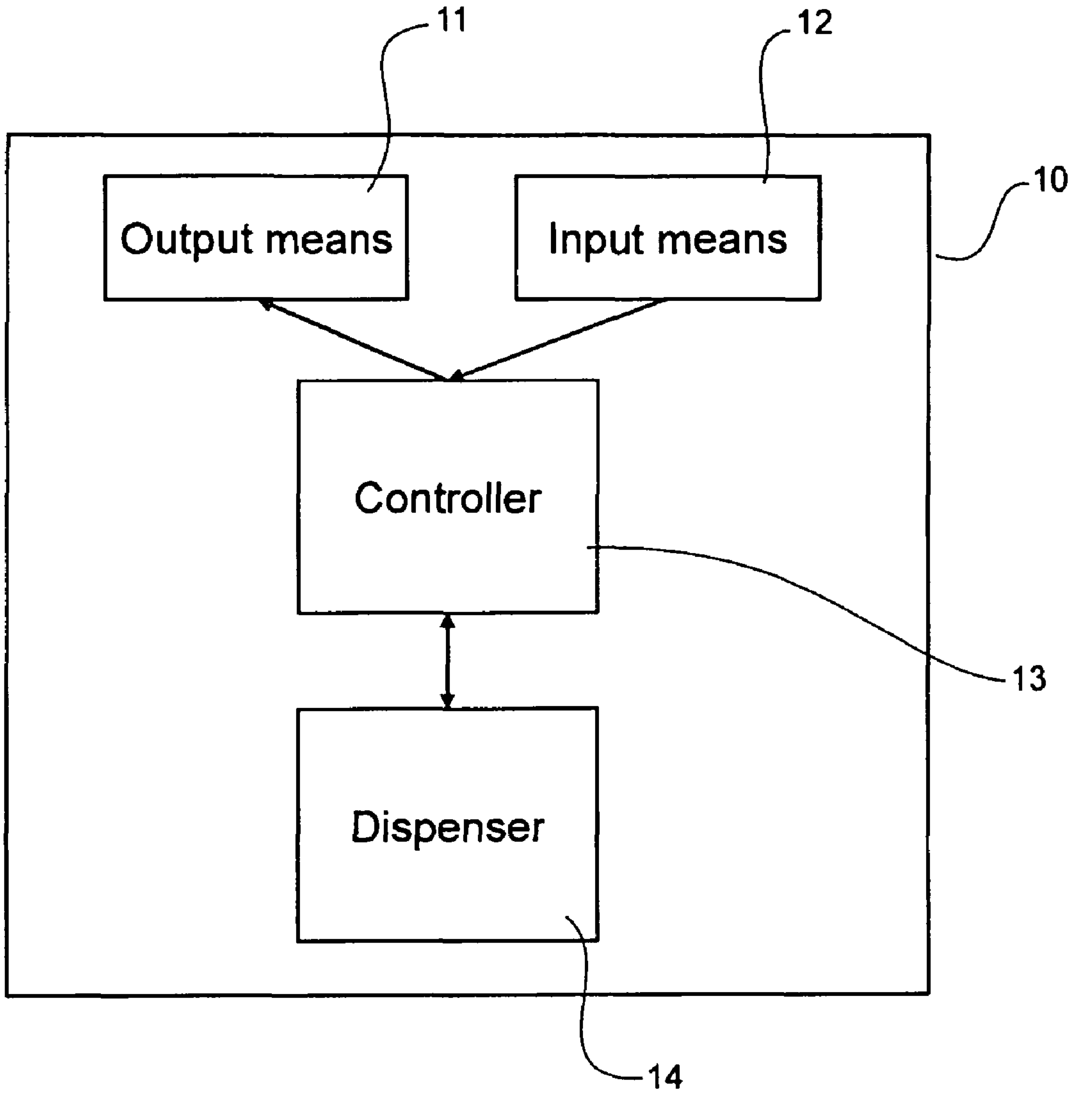
FIG. 1 shows a block diagram of a generic amusement game that implements the present invention.
Figure 2:
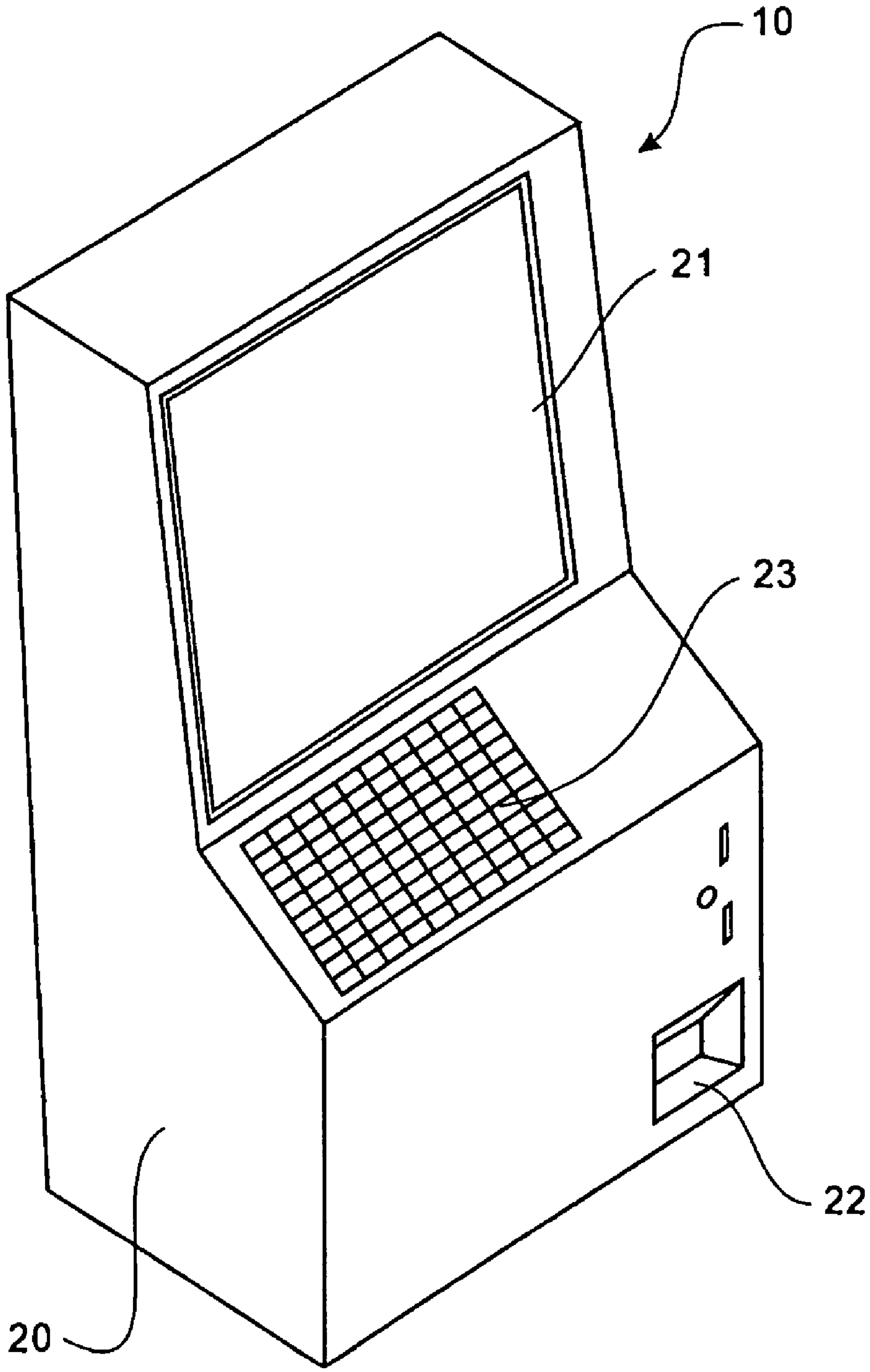
FIG. 2 shows in generic schematic form an amusement game that implements the present invention.

FIG. 1 shows in generic schematic form a block diagram of an amusement game 10 adapted to dispense prizes in accordance with criteria configured or programmed into the machine 10. The amusement game implements win criteria in accordance with a preferred embodiment of the invention that are based on outcomes of game play implemented on the machine 10. It will be appreciated that the criteria for determining which prize to vend, and when, in accordance with the invention could be applied in a range of different amusement game types. The present invention is broadly described in relation to a generic amusement game as shown in FIGS. 1 and 2, and with one specific embodiment of the game being described in relation to FIGS. 4 and 5. It will be appreciated that the present invention for determining which prizes to vend, and when, should not be limited just to the types of games described in the specification, and the particular nature or game play of those games. Those skilled in the art will appreciate that the invention could be applied in a wide range of amusement game types operating a range of games.

Referring to FIG. 1 the amusement game includes an output means 11 and input means 12. The output means 11 could be any type of output means either mechanical and/or electronic that indicates to a player various stages or outcomes of the game play that occur as the game is played. For example, the output means could be a video screen or similar that displays graphical representations of various aspects and events occurring in a game. Alternatively, it could be a back-lit or non back-lit game board. Alternatively, the output means could be a range of lights, indicators, audible outputs and other means for communicating game play outcome to a user. Similarly, the input means 12 could include one or more of a range of mechanical and/or electronic means for enabling a user to input information into an amusement game, make selections and generally play the game. For example, the input means 12 comprise one or more of joysticks, buttons, levers, dials, knobs, touch screens, and the like for controlling the game.

The amusement game 10 also includes a controller 13 which operates the various functions of the amusement game. It is or comprises a processor (such as a microprocessor) or similar with a program or other software that operates the amusement game in accordance with the invention. In particular the processor generates game play as well as performing other functions. The controller 13 is coupled to the output means and input means 11, 12 and receives and transmits information from and to these as the game is played. In particular, the controller will receive input from the user via the input means and operate the game based on this input and in accordance with a computer program. It will then determine various stages of the game and communicate these to the user via the output means 12. The controller 13 is also coupled to or controls a dispenser 14. The dispenser includes a repository of prizes, an outlet and also a mechanical or other suitable means for providing one or more of the prizes in the repository to a player as and when required via the outlet. When the controller 13 determines a user is to win a prize in accordance with events taking place in the game, the controller operates the dispenser 14 to dispense or otherwise vend the particular prize to the user. The dispenser 14 could be any electronic and/or mechanical type dispenser for vending prizes that is known to those skilled in this area of technology.

FIG. 2 shows a possible physical form of an amusement game according to the invention. The amusement game includes a physical outer housing 20 of a suitable size. It may be a free standing game or alternatively be smaller and adapted for support on another means. In this case the amusement game has a video screen output 21 which displays various static and moving images to communicate the various events and stages of play of the game as they occur. It also includes input means 23 which are accessible to the user. In this case the input means is in the form of a touch screen display which displays various buttons and other control indicia that the user can operate by touching the screen 23 in the appropriate places. It will be appreciated that mechanical buttons, joysticks and other control devices can be used instead. The amusement game 20 includes a dispenser (not shown) inside the housing 20, which includes a repository of prizes. The game also includes a dispenser outlet 22 through which prizes that have been dispensed by the machine can be retrieved by the player. The dispenser 14 can be controlled to select one or more of the prizes in the repository and dispense them via the outlet 22.

As discussed previously, the invention can be implemented in any one of a large range of different types of amusement games which offer different types of games to a user. The present invention operates a criteria for determining when a user is to win a prize and the type of prize they win. This can be applied to a range of different games implemented on a range of different amusement games. The criteria are primarily executed in the processor 14. For example, the display might not be a video screen but some type of other display. It could be a mechanical means, or a physical display or game board that mimics or displays the play field of the game. The physical display or game board might be shaped in a particular manner to mimic the play field, and have lights, indicators, sounders and other means for communication game play to the player.

Figure 3:
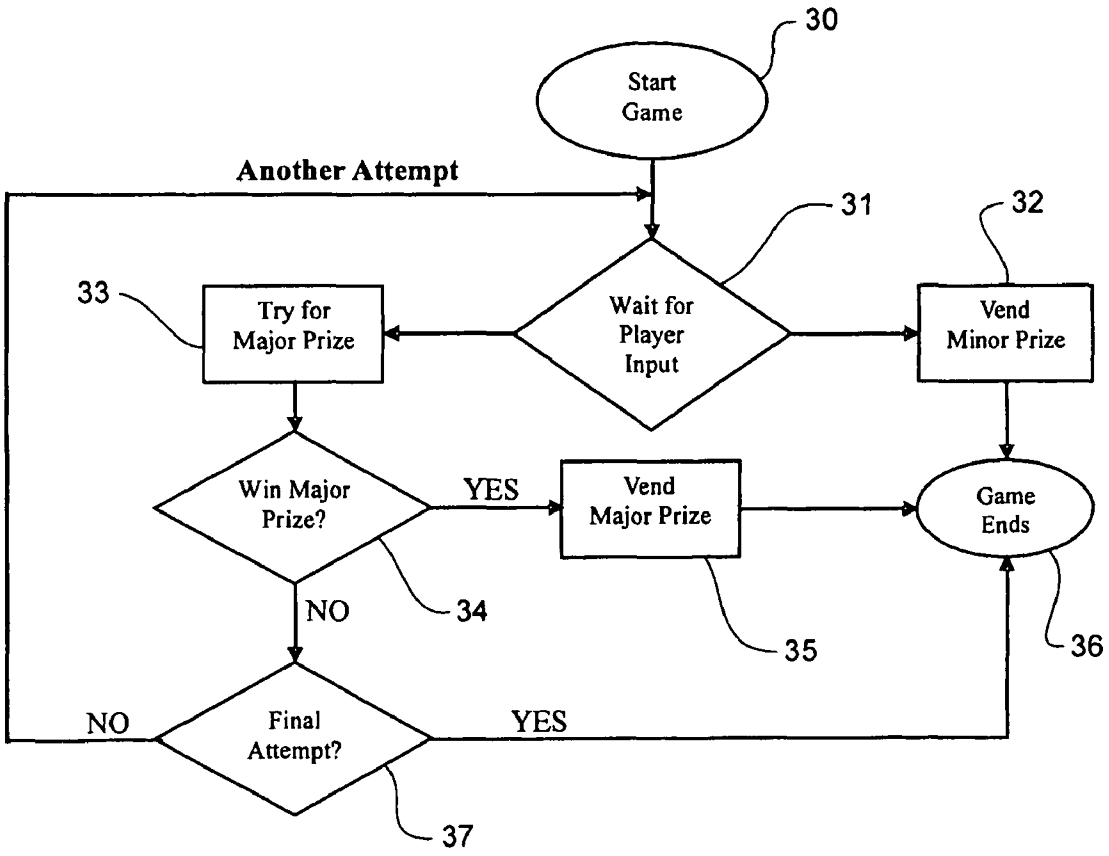
FIG. 3 is a flow diagram showing a method for determining prize dispensing.

The preferred criteria for determining when and what to dispense is depicted in FIG. 3. This shows a flow diagram of how an amusement games determines when and what to dispense based on outcomes of game play implemented on a machine. Initially, the game starts, step 30, and various game play is shown on the output means 11. Either immediately or at a certain point in the game, the user is offered to select whether they wish to receive a minor prize, or alternatively continue playing the game in order to try to win a major prize, step 31. The processor controls this process by operating the various input and output means 12, 11 as required, as will be understood by those skilled in the art. In general terms, a major prize will be more desirable to win than a minor prize. For example, a major prize might be worth more. The nature of major and minor prizes could alter remarkably depending on the circumstances, and can be decided as appropriate by the game operator. If the user selects to receive the minor prize, step 32, then the amusement game dispenses a minor prize in the usual way and the game ends, step 36.

Alternatively, if the user selects that they wish to try to win a major prize step 33, the game continues. At this point, the amusement game implements game play in the usual way. The user continues to control the game 10 through the input means in order to participate in the game play in the usual manner. This might involve completing one "round" or "turn" of the game play. After completing that portion of the game play, and indicating the outcomes on the output means 11 as required, the amusement game 10 then determines whether the game play outcome is associated with the user winning the major prize, step 34. This could, for example, be when a user reaches a certain level in the game. If it does, then the machine 10 dispenses a major prize, step 35, in the usual way and game ends, step 36.

If, however, at that point the game play outcome results in the user not winning a major prize then the amusement game determines whether this was the final attempt at winning permitted, step 37. In the method according to the invention, the user has two or more chances to try to win the major prize in place of a minor prize. The number of chances that the user has to win the major prize will depend on the configuration of the game in accordance with the games owner's wishes. For example, a user might have three attempts to win the major prize or any number up to 10. Other alternatives for numbers of attempts are possible. Alternatively another method might be to provide the user with a certain time within which to win the major prize. Yet another alternative might be to make the last attempt correspond to a particular level or section in the game. Other alternatives for determining when the last attempt occurs could also be envisaged by those skilled in the art. At each point during the game the user would be given a choice to win a major or minor prize, however when the time runs out the choice is removed. Other alternatives are also possible.

If the processor determines that it is the final attempt, then no prize is dispensed and the game ends, step 36. However, if the user has at least one more attempt at the major prize, the amusement game continues in the usual way. At a certain point in the game, the amusement game then returns to step 31 and offers the user the chance to receive the minor prize, step 32, or try again for a major prize. This method carries on until either a) the user selects a minor prize and it is dispensed, b) the user tries for a major prize and wins the major prize and the prize is dispensed, or c) the user tries to win a major prize, does not successfully do so on the final attempt and no prize is dispensed at all.

In each iteration the user has the option to go for the certainty of winning a minor prize, or take a risk and try for the major prize. In one possible embodiment, when winning a major prize, the player will get to select their desired prize from a number of "major" prizes. Similarly, when winning a minor prize, the player will get to select their desired prize from a number of "minor" prizes. However, when risking the major prize there is still the option of being offered the minor prize for several iterations until a final attempt will stop. In each case or turn the minor prize may alter, or become of diminishing value. However, this is not an essential feature, the minor prize might not diminish in value, or change each iteration. Therefore there may be some incentive for the user to vend the minor prize even before the final attempt as they may win a more desirable minor prize than if they choose to receive a minor prize at a later iteration of the game.

As an alternative, the game might not provide a minor prize option at each reiteration of the game. For example, the game operator might change the game so that there are, for example, five attempts at the major prize and only for the first three attempts will the player have the option of taking a minor prize. In the remainder, the user will only have the option of winning the major prize. In this case, rather than reiterating all the steps of the game to provide the user with a choice of a minor or major prize, the game will only reiterate steps that allow the user to win a major prize. Clearly, any other variations of the number of times major/minor prizes are offered for each reiteration will be apparent to those skilled in the art. The game operator has the flexibility to alter these parameters as desired.

A particular implementation of the game will now be described in relation to FIGS. 4 and 5. As noted earlier, it will be appreciated that the game is not restricted to such an implementation however this game is provided for exemplary purposes. In this example, the game is a game of "snakes and ladders" which is a well known board game. The amusement game enables the user to play snakes and ladders and win the prizes in accordance with events in the game play and the criteria of determining prize vending as described in relation to FIG. 3.

In this example a play field 40, which is analogous to the graphics on a traditional board game, is displayed which represents game play. The display might be a physical piece of shaped plastic that looks like a "snakes and ladders" game board, with various spaces for indicating game play. It includes backlights or other indicators for representing the player's position/actions during game play. Alternatively, the display might be a video output screen, for example screen 21 shown in FIG. 2, that displays the play field 40. Irrespective of how it is displayed, the play field includes a number of positions or spaces which a player can occupy and advance forward and backwards depending on a random number. The play field 40 also includes various "snakes" and "ladders" that span across different spaces. When occupying a space in which a snake or ladder extends from or to, the user's "position" will be altered to a corresponding space. Further details of the game will be known to those skilled in the art. It will be appreciated that the play field 40 could alternatively be displayed as a physical graphic or similar, with LEDs or other indicators placed in the various spaces to indicate the current position of the user. Illuminating the LED will indicate where the player is at any particular point in time. In the case of the play field 40 being displayed on a screen 21, a graphic can be displayed on one or more of the spaces indicating where the user resides at that particular point in the game.

Figure 5:
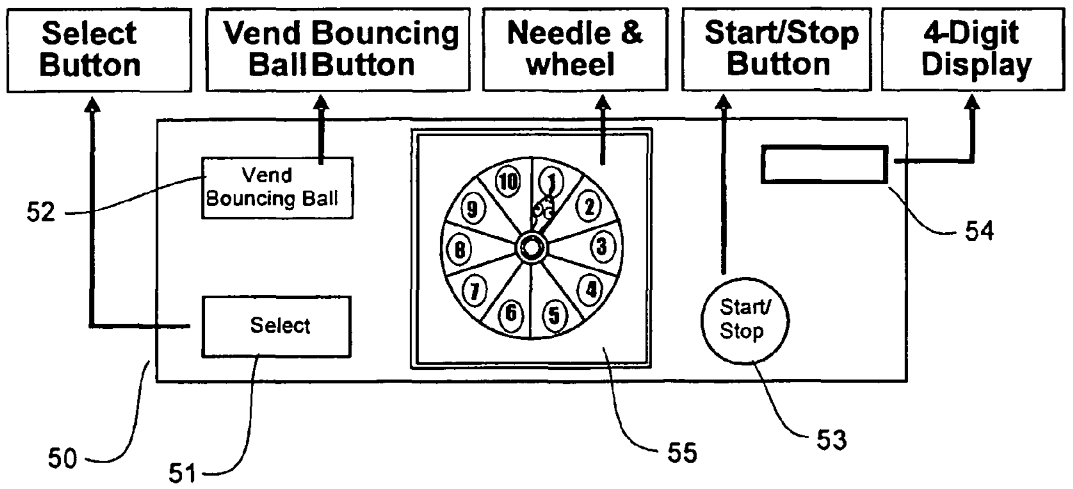
FIG. 5 shows a play field displayed on an output means for one embodiment of the invention.

FIG. 5 shows the control or input means 12 by which the user plays the game and selects various options. In a preferred embodiment these controls are displayed graphically on a touch screen, however it will be appreciated they could be provided in another manner such as through buttons, control knobs, joysticks, dials, levers or the like. The touch display screen 50 includes a select button 51 which enables a user to select whether or not they want to try to win a major prize. A vending bouncing ball button 52 is used by the player to indicate they wish to win a minor prize. A start/stop button 53 is provided for controlling to random number wheel 55. A display 54 is provided that displays the number of attempts the player has left before their option to vend a minor prize is lost. In the centre of the screen 50 is a graphic 55 showing a needle and wheel for determining how many spaces the player will move along the play field 40 on any particular turn. By pushing the start/stop button 53 the needle will begin rotating and by pushing the start/stop button again the needle will stop. The position on which the needle lands indicates a number which determines the number of spaces that the player will move on the play field 40 for that turn. Alternatively, the needle is spinning continuously. The needle only stops and shows a number when the player presses the start/stop button. If they do not, the needle keeps spinning. If they select the minor prize, the needle keeps spinning also. It will be appreciated that an alternative means of determining random number for advancing along the play field 40 could also be envisaged.

Figure 4:
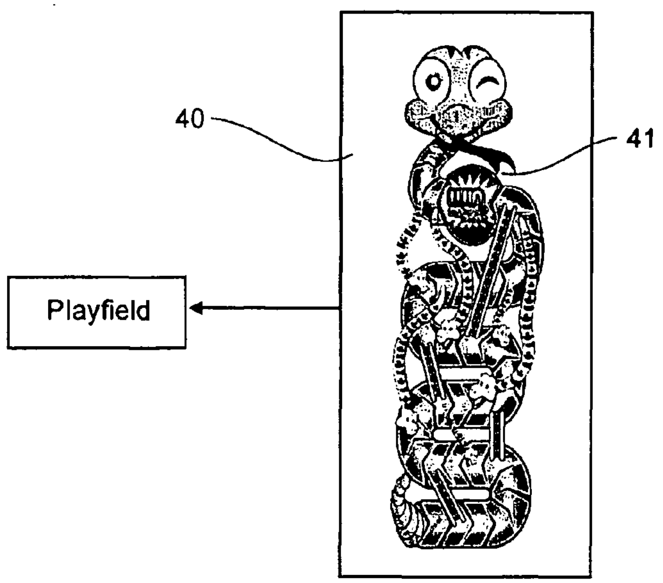
FIG. 4 shows an input means for one embodiment of the invention.

Referring to FIGS. 4 and 5 and also the method of playing the game as shown in FIG. 3, the manner in which the game is played will be described. The player will start the game by inserting coins or crediting the game in another suitable manner for example by tokens, debit card or credit card. At this point the game is ready to play the player is offered the option of receiving a minor prize and ending the game, or continuing to play the game to attempt to win the major prize, step 31. If at step 31 the user decides to take the minor prize, then the machine dispenses the minor prize, step 32, in this case a bouncing ball (or other suitable minor prize). At this point the game ends, step 36, and further credit is required to play the game again. The user selects to receive the minor prize by pressing the vend bouncing ball button 52 on the input means screen 50. It will be appreciated that other types of minor prizes could be vended as alternatives.

However, if the user at step 31 decides they want to try to win the major prize they press the select button 51 and then the game continues. The major prize is won by advancing the position indicator through all the spaces until it reaches the "win space" 41 at the top of the play field 40. The user then commences playing the game by pressing the start/stop button 53 and releasing it to determine the number of spaces they can move on the play field 40. When a number has been selected by the needle, for example "1" as shown in FIG. 5, the play field 40 is then updated to show the new position of the player. Initially the player starts in space one, and can move forward the number of spaces indicated by the needle and the wheel 55. If after repositioning the player, the player ends up on occupying a space where there is a snake or ladder the player's position will be moved accordingly. For example in this case where the player moves to position two the ladder will actually move the player up to position 10 and this will be indicated on the play field 40 on the video screen 21. This constitutes one turn of the game.

At this point the amusement game determines whether the player has won the major prize, step 34, namely whether their position indicator has advanced all the way to the "win space" 41. If the position indicator has done so, the amusement game determines that they have won the major prize, step 34, and the game dispenses the major prize, step 35, and the game ends, step 36. Alternatively, if the position indicator has not reached the win space 41 then the game at step 37 determines whether this was the player's final attempt.

In this embodiment of the invention, the player is given three attempts to win the major prize, before failing to do so results in a no prize and ending of the game. At this point, the user has only attempted to win the major prize once and therefore the game will not end, but rather the user gets another chance to play the game further. The processor returns to step 31 where it waits for user input on whether to take the minor prize, or continue to try for the major prize. The display 54 shows the number of times left the user gets to try for the major prize, in this case, three. The display will then decrease the display 54 by one to show that only two attempts are now left.

At this point step 31 again the user determines whether they want to receive the minor prize by pressing the vend bouncing ball button 52, or alternatively continue to try for the major prize by pressing select button 51. If they choose the minor prize, the game 10 vends the minor prize, step 32, and the game ends, step 36. Otherwise, if the user chooses to try for the major prize, step 33, the game continues. The user presses the start/stop button 53 and releases it again to determine another number, and the position indicator is advanced the number of spaces on the needle and wheel, and then also advanced or retreated in accordance with the play field 40.

After taking the turn and moving the position indicator accordingly, the system determines in step 34 whether the position indicator has reached the "win space" 41 and that the user has won the major prize. If they have, the major prize is vended, step 35, and the game ends, step 36. Alternatively if the final attempt has not been reached, in accordance with the display 54, the user gets another go. Where it is the final attempt, namely the display 54 shows the number zero, then if the user has not won the major prize by reaching the win space 41, then the game ends, step 36, without a prize being dispensed. The user receives no prize and must enter more credit in order to play the game again.

It will be appreciated that it is not necessary for the steps of the method to occur in the particular order noted—any suitable order is possible. For example, a player may have one or more turns of the game before they are offered a selection of a minor or major prize. Alternatively, several steps of the game may occur between each choice of vending a minor prize or going for a major prize. Other variations will also be apparent to those skilled in the art.

The invention claimed is:

1. An amusement game adapted to dispense prizes comprising:
- a processor for generating game play;
- a display adapted to communicate game play outcomes generated by the processor to a user;
- an input adapted to enable a user to influence the processor's generation of game play outcomes;
- a dispenser adapted to store prizes and dispense prizes via an outlet;
- wherein the processor executes a program and is adapted to operate the dispenser to dispense prizes to a user in accordance with the program, the program being adapted to:
  - i) receive input indicating whether the user wants to win a major prize or a minor prize;
  - ii) if the received input indicates the user wants to win the minor prize, control the dispenser of the amusement game to dispense the minor prize;
  - iii) if the received input indicates the user wants to win the major prize:
    - a) generate game play;
    - b) if the game play outcome corresponds to a user winning the major prize, operate the dispenser to dispense the major prize;
    - c) if the game play outcome does not correspond to a user winning the major prize, determining whether the user is allowed a further attempt to win the prize;
    - d) if the user is allowed a further attempt to win the major prize, reiterate steps i)-iii); and
    - e) if the user is not allowed a further attempt to win the major prize, terminate game play.

2. An amusement game according to claim 1, wherein the program determines whether the user is allowed a further attempt to win a prize if the number of times the user has attempted to win a prize is below a threshold number, level or section in the game.

3. An amusement game according to claim 1, wherein the program determines the user is allowed a further attempt to win a prize if a predetermined period of time has not elapsed.

4. An amusement game according to claim 1, wherein the major prize is more desirable than the minor prize.

5. An amusement game according to claim 1, wherein the output display is at least one of a game board, array of lamps/LED's, mechanical display, and video screen.

6. An amusement game according to claim 1, wherein the input comprises at least one control device to enable a user to control game play.

7. An amusement game according to claim 6, wherein the input is a touch screen and the at least one control device is indicia displayed on the touch screen.

8. An amusement game according to claim 6, wherein each control device is at least one of a: joystick; button; dial; lever; and knob.

9. An amusement game according to claim 1, wherein the game play imitates a board game and the game play outcome corresponds to positions reached on a board game.

10. An amusement game according to claim 1, wherein in step d) for at least one reiteration the program is adapted to reiterate step iii) only.

11. A program for implementation in an amusement game played by a user for determining when to dispense a prize to the user, the program being adapted to:
- i) receive input indicating whether the user wants to win a major prize or a minor prize;
- ii) if the received input indicates the user wants to win the minor prize, operate a dispenser of the amusement game to dispense the minor prize;
- iii) if the received input indicates the user wants to win the major prize:
  - a) generate game play;
  - b) if the game play outcome corresponds to a user winning the major prize, operate the dispenser of the amusement game to dispense the major prize;
  - c) if the game play outcome does not correspond to a user winning the major prize, determining whether the user is allowed a further attempt to win a prize;
  - d) if the user is allowed a further attempt to win a prize, reiterate steps i)-iii);
  - e) if the user is not allowed a further attempt to win a prize, terminate game play.

12. A program according to claim 11, wherein the program determines that the user is allowed a further attempt to win a prize if the number of times the user has attempted to win a prize is below a threshold number.

13. A program according to claim 11, wherein the program determines the user is allowed a further attempt to win a prize if a predetermined period of time has not elapsed.

14. A program according to claim 11, wherein a major prize is more desirable than a minor prize.

15. A program according to claim 14, wherein in step d) for at least one reiteration the program is adapted to reiterate step iii) only.

* * * * *